United States Patent
Morey et al.

(10) Patent No.: US 6,169,825 B1
(45) Date of Patent: Jan. 2, 2001

(54) INTEGRATED OPTICAL POLARIZER

(75) Inventors: Joanna Claire Morey, Bicester; Matthew Peter Shaw, Oxford; James Stuart McKenzie, Uxbridge, all of (GB)

(73) Assignee: Bookham Technology Ltd., Oxfordshire (GB)

( * ) Notice: Under 35 U.S.C. 154(b), the term of this patent shall be extended for 0 days.

(21) Appl. No.: 09/111,888

(22) Filed: Jul. 8, 1998

(30) Foreign Application Priority Data

Aug. 30, 1997 (GB) .................................................. 9718346

(51) Int. Cl.[7] ...................................................... G02B 6/00
(52) U.S. Cl. .............................. 385/11; 385/14; 385/29; 385/131; 385/132
(58) Field of Search ................................. 385/11, 14, 29, 385/131, 132

(56) References Cited

U.S. PATENT DOCUMENTS

| | | |
|---|---|---|
| 4,359,260 | 11/1982 | Reinhart et al. . |
| 4,789,212 * | 12/1988 | Bristow .................................. 385/11 |
| 5,078,516 | 1/1992 | Kapon et al. ......................... 385/129 |
| 5,202,938 | 4/1993 | Man et al. ............................. 385/11 |
| 5,243,669 | 9/1993 | Alferness et al. ..................... 385/11 |
| 5,483,609 | 1/1996 | Nakaya .................................. 385/29 |
| 5,528,719 * | 6/1996 | Yamada ................................ 385/137 |
| 5,757,986 * | 5/1998 | Crampton ................................ 385/2 |
| 6,063,299 * | 5/2000 | Drake ..................................... 216/24 |

FOREIGN PATENT DOCUMENTS

88/07215    9/1988  (WO) .

OTHER PUBLICATIONS

Saini, Sharma and Singh; Strong Effect of Output Coupling on the Performance of Metal–Clad Waveguide Polarizers; Optics Letters; Feb. 15,1995, pp. 365–367.

Schmidtchen, Splett, Schuppert and Peterman; Low Loss Singlemode Optical Waveguides with Large Cross–Section in Silicon–On–Insulator, Electronics Letters; 1991, pp. 1486–1488.

* cited by examiner

Primary Examiner—Darren Schuberg
Assistant Examiner—Leo Boutsikaris
(74) Attorney, Agent, or Firm—Roberts Abokhair & Mardula LLC.

(57) ABSTRACT

The polarizer is formed on a silicon rib waveguide (4) having an upper face and two side faces, and comprises a section of the silicon rib waveguide (4) with a buffer layer (6) and a light absorbing layer (7) on either the upper face of the rib or at least one side face of the rib. The buffer layer (6) has a refractive index similar to that of the waveguide (4) such that light traveling along the waveguide (4) and incident upon the respective face thereof passes into the buffer layer (6) and then into the light absorbing layer (7) so either the TM (transverse magnetic) or TE (transverse electric) mode of the light traveling along the waveguide is attenuated.

19 Claims, 2 Drawing Sheets

INTEGRATED OPTICAL POLARIZER

RELATIONSHIP TO OTHER APPLICATIONS

The present application claims priority under 35 USC 119 from Great Britain application No. GB9718346.1, entitled "INTEGRATED OPTICAL POLARIZER" filed Aug. 30, 1997. The disclosures of the referenced application is hereby incorporated herein by reference.

FIELD OF THE INVENTION

This invention relates to an integrated optical polarizer for a silicon rib waveguide.

BACKGROUND OF THE INVENTION

Integrated optical circuits often require the light transmitted therein to be polarized. This can be achieved using a separate polarizer, e.g. in the form of an optical fibre, connected to the chip carrying the optical circuit. It would, however, be preferable for the polarizer to be integrated on the chip.

SUMMARY OF THE INVENTION

The present invention provides an integrated optical polarizer formed on a silicon rib waveguide having an upper face and two side faces, the polarizer comprising a section of the silicon rib waveguide having a buffer layer and a light absorbing layer on either the upper face of the rib or at least one side face of the rib, the buffer layer having a refractive index such that light traveling along the waveguide and incident upon the respective face of the rib waveguide passes into the buffer layer and then into the light absorbing layer whereby either the (TM) transverse magnetic or (TE) transverse electric mode of the light traveling along the waveguide is attenuated.

According to another aspect of the invention, there is provided a method of forming a polarizer on a silicon rib waveguide having an upper face and two side faces in which a buffer layer is provided on the upper face or at least one of the side faces of a section of the rib, and a light absorbing layer provided on the buffer layer, the buffer layer having a refractive index such that light traveling along the waveguide and incident upon the respective face of the rib waveguide passes into the buffer layer and then into the light absorbing layer whereby either the TM or TE mode of the light traveling along the waveguide is attenuated.

Preferred and optional features of the invention will be apparent from the detailed disclosure of the specification.

BRIEF DESCRIPTION OF THE DRAWINGS

The invention will now be further described, merely by way of example, with reference to the accompanying drawings, in which.

DETAILED DESCRIPTION OF THE PREFERRED EMBODIMENT

The polarizer described herein is based on a silicon-on-insulator chip. A process for forming this type of chip is described in a paper entitled "Reduced defect density in silicon-on-insulator structures formed by oxygen implantation in two steps" by J. Morgail et al. Appl. Phys. Lett., 54, p526, 1989, which is herein incorporated by reference in its entirety. This describes a process for forming a Very Large Scale Integrated (VLSI) silicon-on-insulator wafer. The silicon layer of such a wafer is then increased, e.g. by epitaxial growth, to make it suitable for forming the basis of the integrated interferometer described herein.

Figure 1:
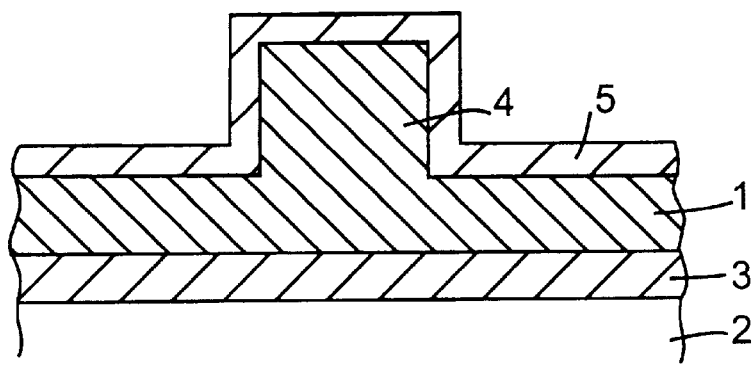
FIG. 1. illustrates a cross-sectional view of a known rib waveguide formed in a silicon-on-insulator chip.

FIG. 1 illustrates a cross-section of an optical waveguide formed on such a chip. The chip comprises a layer of silicon 1 that is separated from a silicon substrate 2 by a layer of silicon dioxide 3. The rib waveguide 4 is formed in the silicon layer 1. FIG. 1 also shows an oxide cladding 5 formed over the rib waveguide 4. Further details of this form of waveguide are given in a paper entitled "Low Loss Single Mode Optical Waveguides with Large Cross-Section in Silicon-on-Insulator" by J. Schmidtchen et al in Electronic Letters, 27, p1486, 1991 and in PCT patent specification no. WO95/08787, each of which is herein incorporated by reference in their entirety.

This form of waveguide provides a single mode, low loss (typically less than 0.2 dB/cm for the wavelength range 1.2 to 1.6 microns) waveguide typically having dimensions in the order of 3 to 5 microns which can be coupled to optical fibers and which is compatible with other integrated components. This form of waveguide can also be easily fabricated from conventional silicon-on-insulator wafers (as described in WO95/08787 referred to above) and so is relatively inexpensive to manufacture.

Figure 2:
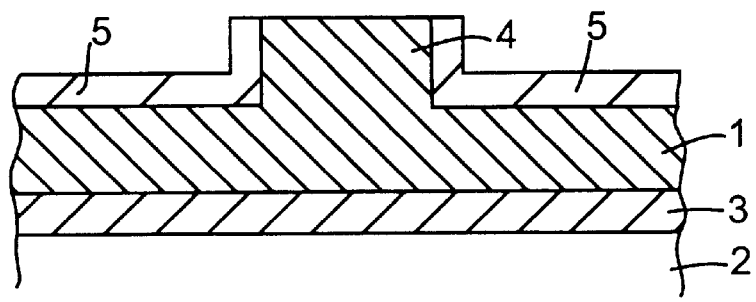
FIG. 2 illustrates removal of oxide cladding from a top surface of the rib shown in FIG. 1.

FIG. 2 illustrates with the oxide cladding removed a top surface of the rib shown in FIG. 1. The polarizer described herein is formed on a section of a silicon rib waveguide 4. In the preferred embodiment, the oxide cladding 5 is first removed from the upper surface of the rib 4, e.g. by using buffered hydrofluoric acid.

Figure 3:
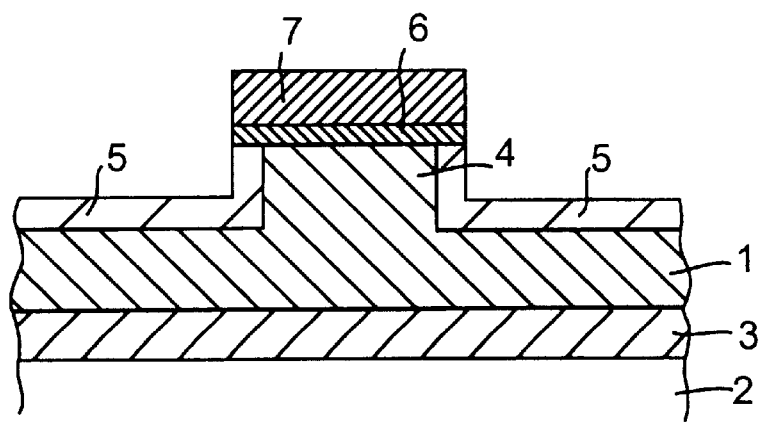
FIG. 3 illustrates a cross-sectional view illustrating the structure of a polarizer formed on the rib.

As shown in FIG. 3, a buffer layer 6 is illustrated as deposited on the rib 4 followed by a light absorbing layer 7.

Unpolarized light traveling along the rib waveguide 4 comprises TM and TE modes. The polarizer shown in FIG. 3 is designed to attenuate the TM mode. The angle of incidence of the TM mode with the top surface of the rib waveguide is very shallow. Thus, to cause a significant proportion of the TM mode to be transmitted through this surface rather than being totally internally reflected therefrom, it is necessary to provide a layer thereon having a refractive index as close as possible to that of the silicon waveguide. Silicon has a high refractive index, of about 3.5, therefore the buffer layer 6 deposited thereon should, preferably, also have a high refractive index.

If the buffer layer 6 is formed of a material having a refractive index of at least 2, an appreciable proportion of the TM mode passes into the buffer layer and hence into the light absorbing layer 7 deposited thereon, thereby causing attenuation of the TM mode.

The buffer layer 6 can, for instance, be formed of zinc sellenide, which has a refractive index of about 2.5, or of a similar dielectric material.

The light absorbing layer 7 is preferably a metallic layer, e.g. of aluminum. The metallic layer 7 causes attenuation of the light received from the waveguide.

The use of a high refractive index buffer layer 6 is critical in forming a polarizer for applications which demand a high level of performance, e.g. having a high extinction ratio, for example, at least 40 dB.

The native oxide layer 5 can also be used as the buffer layer, although the performance of the polarizer is limited as the refractive index step between the silicon (having a refractive index of about 3.5) and the oxide layer (having a refractive index of about 1.5) is relatively large. An extinction ratio (between the TM and TE modes) of about 10–12 dB over a length of about 3 mm can be achieved with such a structure.

The thickness of the oxide layer 5 is also difficult to control as it can grow too thick and thus reduce the extinction ratio even further and is not therefore ideally suited to a reproducible production process, although in some circumstances it may be satisfactory.

For these reasons, the oxide layer is preferably removed and replaced by a buffer layer 6 of higher refractive index as described above. The buffer layer must be formed of a material having a suitable refractive index, and should not be an oxide (otherwise the native silicon dioxide layer is likely to re-form). The higher the refractive index of the material selected, the less likely its temperature dependence will affect the polarization extinction ratio. For a buffer layer with a high refractive index, appreciable attenuation of the TM mode occurs over a wider range of buffer thicknesses, with maximum attenuation occurring at a greater thickness the higher the refractive index.

Figure 4:
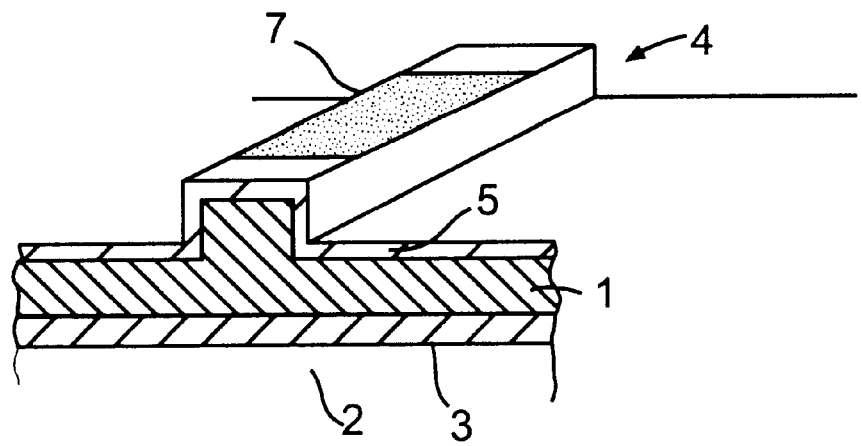
FIG. 4 illustrates a perspective view of a polarizer such as that shown in FIG. 3.

FIG. 4 shows a perspective view of such a polarizer formed on a section of rib waveguide (a "polarizer section"). The polarizer section typically has a length of approximately 3 mm or less and in a preferred embodiment the polarizer section has a length of approximately 1 mm or less.

Figure 5:
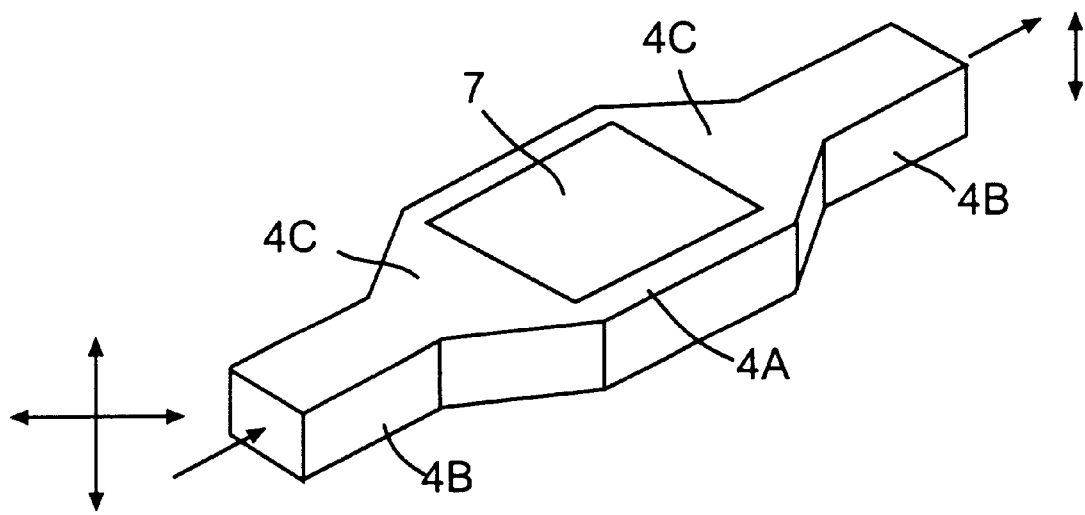
FIG. 5 illustrates a perspective view of another embodiment of a polarizer formed on a broadened portion of a rib waveguide.

FIG. 5 shows a modified form of polarizer. In this embodiment, the rib waveguide 4 has tapered regions 4C on either side of the polarizer section and the polarizer is formed on a section 4A of the waveguide that is wider than the sections 4B of waveguide leading thereto and therefrom. The polarizer section 4A is typically at least 8 microns wide and in a preferred embodiment is approximately 10 microns wide.

This embodiment has a number of advantages. Firstly, it allows greater variation in the accuracy of alignment of a mask used in the removal of the oxide layer 5 and consequesently increases the tolerances permitted during the manufacturing process. Secondly, the affect of the buffer layer 6 and metallic layer 7 is increased as they now extend over a majority of the wave traveling along the waveguide. In a 4 micron wide rib waveguide an appreciable portion of the wave travels in regions of the silicon layer 1 lying beyond the lateral extent of the rib 4 and so is not affected by the layers applied to the top surface of the rib, whereas in a 10 micron wide rib waveguide, the majority of the wave travels in the rib and in the region of the silicon layer 1 directly beneath the rib 4 and so is affected by the layers applied to the top of the rib 4.

The tapered regions 4C typically have a length of around 1 mm.

The buffer layer 6 typically has a thickness in the range of 20 to 500 Angstroms. In a preferred embodiment, this thickness is in the range of 80 to 220 Angstroms depending on the refractive index of the buffer layer. A thickness of around 170 Angstroms may, for example, be used for a buffer layer having a refractive index greater than 2.0 whereas a buffer layer of silicon dioxide, which has a refractive index of about 1.5, may only have a thickness of about 30 Angstroms.

The metallic layer 7 typically has a thickness of 1–2 microns but may be considerably thinner, e.g. 500 Angstroms or less, so long as it functions to absorb light.

As shown, the buffer layer and metallic layer 7 can extend into the tapered regions 4C.

It will be appreciated that the buffer layer 6 and metallic layer 7 can be provided on a side face of the rib 4, or on both side faces, to attenuate the TE mode. However, it is generally easier to provide these layers on the upper surface of the rib 4 as described above. If the buffer layer and metallic layer were provided over both top and side surfaces of the rib 4, they would cause attenuation of both the TE and TM mode as a result the device would not act as a polarizer.

As mentioned above, a significant feature of the polarizer described herein is that it is integrated with the rib waveguide. It can therefore form part of an integrated optical circuit formed on a silicon-on-insulator chip with all the advantages this entails. The difficulties of using a separate off-chip polarizer are thus avoided.

As discussed above, a buffer layer of high refractive index is preferably required to provide a high performance polarizer in view of the shallow angle of incidence of the TM mode with the upper surface of the rib waveguide. However, it should be noted that the angle of incidence can also be increased by increasing the height of the rib waveguide 4. As mentioned above, the rib waveguide typically has a width of about 4 microns and a height of about 4 microns (measured from the top of the silicon layer 1). However, larger rib waveguides, e.g. having a height of up to 10 microns, may be used in some circumstances.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, but are not expressly stated herein. These modifications, alterations and improvements are intended to be suggested hereby, and within the scope of the invention.

We claim:

1. An integrated optical polarizer formed on a silicon rib waveguide having an upper face and two side faces, the polarizer comprising a section of the silicon rib waveguide, the polarizer section, and having a buffer layer and a light absorbing layer on one or more selected faces of the rib chosen from the group consisting of: the upper face of the rib, one of the two side faces of the rib, or both of the two side faces of the rib, the buffer layer having a refractive index such that light traveling along the waveguide and incident upon the one or more selected faces of the rib waveguide passes into the buffer layer and then into the light absorbing layer whereby either the transverse magnetic, TM, or transverse electric, TE, mode of the light traveling along the waveguide is attenuated.

2. The integrated optical polarizer of claim 1 where the buffer layer has a refractive index of at least two.

3. The integrated optical polarizer of claim 2 where the buffer layer comprises zinc sellenide.

4. The integrated optical polarizer of claim 1 where the buffer layer has a thickness of approximately 20 to 500 Angstroms.

5. The integrated optical polarizer of claim 4 where the buffer layer has a thickness of approximately 80 to 220 Angstroms.

6. The integrated optical polarizer of claim 1 where the light absorbing layer comprises a metallic layer.

7. The integrated optical polarizer of claim 6 where the metallic layer is formed of aluminum.

8. The integrated optical polarizer of claim 1 wherein the polarizer section has a length of up to three mm.

9. The integrated optical polarizer of claim 8 wherein the polarizer section has a length of approximately up to one mm.

10. The integrated optical polarizer of claim 1 where the rib waveguide has width and height dimensions of up to ten microns.

11. The integrated optical polarizer of claim 10 where the rib waveguide has width and height dimensions in the range of three to five microns.

12. An integrated optical polarizer formed on a silicon rib waveguide having an upper face and two side faces, the polarizer comprising a section of the silicon rib waveguide, the polarizer section, and having a buffer layer and a light absorbing layer on one or more selected faces of the rib chosen from the group consisting of: the upper face of the rib, one of the two side faces of the rib, or both of the two side faces of the rib, the buffer layer having a refractive index such that light traveling along the waveguide and incident upon the one or more selected faces of the rib waveguide passes into the buffer layer and then into the light absorbing layer whereby either the transverse magnetic, TM, or transverse electric, TE, mode of the light traveling along the waveguide is attenuated, wherein the polarizer is formed on a section of the rib wider than the sections of rib leading thereto and therefrom.

13. The integrated optical polarizer of claim 12 in which the rib waveguide tapers between the wider section on which the polarizer is formed and the sections leading thereto and therefrom.

14. The integrated optical polarizer of claim 12 where the polarizer is formed on a section of the rib at least eight microns wide.

15. The integrated optical polarizer of claim 12 where the polarizer is formed on a section of the rib at least ten microns wide.

16. A method of forming a polarizer on a silicon rib waveguide having an upper face and two side faces in which a buffer layer is provided on one or more selected faces of a section of the rib chosen from the group consisting of: the upper face of the rib, one of the two side faces of the rib, or both of the side faces of the rib, and a light absorbing layer is provided on the buffer layer, the buffer layer having a refractive index such that light traveling along the waveguide and incident upon the one or more selected faces of the rib waveguide passes into the buffer layer and then into the light absorbing layer whereby either the transverse magnetic, TM, or transverse electric, TE, mode of the light traveling along the waveguide is attenuated.

17. The method of claim 16 where an oxide layer is removed from the one or more selected faces of a section of the rib and the buffer layer has a refractive index of two or more and is deposited thereon.

18. The method of claim 17 where the oxide layer is removed using hydrofluoric acid.

19. The method of claim 18 where the buffer layer comprises zinc sellenide.

* * * * *